(12) United States Patent
Holm et al.

(10) Patent No.: US 7,487,180 B2
(45) Date of Patent: *Feb. 3, 2009

(54) SYSTEM AND METHOD FOR RECOGNIZING AUDIO PIECES VIA AUDIO FINGERPRINTING

(75) Inventors: Frode Holm, Santa Barbara, CA (US); Wendell T. Hicken, La Verne, CA (US)

(73) Assignee: MusicIP Corporation, Monrovia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/345,548

(22) Filed: Jan. 31, 2006

(65) Prior Publication Data

US 2006/0190450 A1    Aug. 24, 2006

Related U.S. Application Data

(63) Continuation of application No. 10/668,926, filed on Sep. 23, 2003, now Pat. No. 7,013,301.

(51) Int. Cl.
*G06F 17/30* (2006.01)
*G06F 17/00* (2006.01)

(52) U.S. Cl. ............... 707/104.1; 707/9; 713/176
(58) Field of Classification Search ........... 707/3, 707/6, 9, 10, 104.1; 705/44; 713/176; 702/185
See application file for complete search history.

(56) References Cited

U.S. PATENT DOCUMENTS 4,807,169 A    2/1989    Overbeck (Continued)

FOREIGN PATENT DOCUMENTS

EP    0 751 471 A1    1/1997

(Continued)

OTHER PUBLICATIONS

Kim et al. Boosted Binary Audio Fingerprint Based on Spectral Subrand Moments, Acoustic and Signal Processing, 2007, ICASSP Conference, Apr. 15-20, 2007, vol. 1, p. I-241-I-244.*

(Continued)

*Primary Examiner*—Baoquoc N To
(74) *Attorney, Agent, or Firm*—Christie, Parker & Hale, LLP.

(57) ABSTRACT

An audio fingerprinting system and method. A server receives an audio fingerprint of a first audio piece, searches a database for the audio fingerprint, retrieves an audio profile vector associated with the audio fingerprint, updates user preference information based on the audio profile vector, and selects a second audio piece based on the user preference information. The audio fingerprint is generated by creating a matrix based on the frequency measurements of the audio piece, and performing a singular value decomposition of the matrix. To expedite the search of the database and to increase matching accuracy, a subset of candidates in the database is identified based on the most prominent musical notes of the audio piece, and the search is limited to the identified subset. One of the attributes of the audio profile vector is a particular audio class. An identifier for the audio class is generated based on an average of audio fingerprints of the audio pieces belonging to the audio class.

22 Claims, 7 Drawing Sheets

U.S. PATENT DOCUMENTS

| | | | |
|---|---|---|---|
| 4,996,642 A | 2/1991 | Hey | |
| 5,124,911 A | 6/1992 | Sack | |
| 5,210,611 A | 5/1993 | Yee et al. | |
| 5,233,520 A | 8/1993 | Kretsch et al. | |
| 5,412,564 A | 5/1995 | Ecer | |
| 5,583,763 A | 12/1996 | Atcheson et al. | |
| 5,612,729 A | 3/1997 | Ellis et al. | |
| 5,616,876 A | 4/1997 | Cluts | |
| 5,644,727 A | 7/1997 | Atkins | |
| 5,703,308 A | 12/1997 | Tashiro et al. | |
| 5,704,017 A | 12/1997 | Heckerman et al. | |
| 5,724,567 A | 3/1998 | Rose et al. | |
| 5,734,444 A | 3/1998 | Yoshinobu | |
| 5,749,081 A | 5/1998 | Whiteis | |
| 5,790,426 A | 8/1998 | Robinson | |
| 5,812,937 A | 9/1998 | Takahisa et al. | |
| 5,832,446 A | 11/1998 | Neuhaus | |
| 5,859,414 A | 1/1999 | Grimes et al. | |
| 5,872,850 A | 2/1999 | Klein et al. | |
| 5,884,282 A | 3/1999 | Robinson | |
| 5,899,502 A | 5/1999 | Del Giorno | |
| 5,918,223 A | 6/1999 | Blum et al. | |
| 5,954,640 A | 9/1999 | Szabo | |
| 5,960,440 A | 9/1999 | Brenner et al. | |
| 5,963,948 A | 10/1999 | Shilcrat | |
| 5,969,283 A | 10/1999 | Looney et al. | |
| 5,978,766 A | 11/1999 | Luciw | |
| 5,979,757 A | 11/1999 | Tracy et al. | |
| 5,999,975 A | 12/1999 | Kittaka et al. | |
| 6,009,392 A * | 12/1999 | Kanevsky et al. | 704/245 |
| 6,012,051 A | 1/2000 | Sammon, Jr. et al. | |
| 6,018,738 A | 1/2000 | Breese et al. | |
| 6,020,883 A | 2/2000 | Herz et al. | |
| 6,041,311 A | 3/2000 | Chislenko et al. | |
| 6,046,021 A | 4/2000 | Bochner | |
| 6,061,680 A | 5/2000 | Scherf et al. | |
| 6,088,455 A | 7/2000 | Logan et al. | |
| 6,112,186 A | 8/2000 | Bergh et al. | |
| 6,148,094 A | 11/2000 | Kinsella | |
| 6,192,340 B1 | 2/2001 | Abecassis | |
| 6,232,539 B1 | 5/2001 | Looney et al. | |
| 6,236,974 B1 | 5/2001 | Kolawa et al. | |
| 6,236,978 B1 | 5/2001 | Tuzhilin | |
| 6,236,990 B1 | 5/2001 | Geller et al. | |
| 6,288,319 B1 | 9/2001 | Catona | |
| 6,358,546 B1 | 3/2002 | Bebiak et al. | |
| 6,370,513 B1 | 4/2002 | Kolawa et al. | |
| 6,442,517 B1 | 8/2002 | Miller et al. | |
| 6,453,252 B1 | 9/2002 | Laroche | |
| 6,512,837 B1 * | 1/2003 | Ahmed | 382/100 |
| 6,539,395 B1 | 3/2003 | Gjerdingen et al. | |
| 6,657,117 B2 | 12/2003 | Weare et al. | |
| 6,671,550 B2 * | 12/2003 | Iaizzo et al. | 607/27 |
| 6,697,779 B1 | 2/2004 | Bellegarda et al. | |
| 6,721,489 B1 | 4/2004 | Benyamin et al. | |
| 6,725,102 B2 | 4/2004 | Sun | |
| 6,771,797 B2 * | 8/2004 | Ahmed | 382/100 |
| 6,823,225 B1 | 11/2004 | Sass | |
| 6,941,275 B1 | 9/2005 | Swierczek | |
| 6,941,324 B2 | 9/2005 | Plastina et al. | |
| 6,953,886 B1 | 10/2005 | Looney et al. | |
| 6,961,430 B1 | 11/2005 | Gaske et al. | |
| 6,961,550 B2 | 11/2005 | Ricard et al. | |
| 6,963,975 B1 * | 11/2005 | Weare | 713/176 |
| 6,967,275 B2 | 11/2005 | Ozick | |
| 6,990,453 B2 * | 1/2006 | Wang et al. | 704/270 |
| 7,003,515 B1 | 2/2006 | Glaser et al. | |
| 7,010,485 B1 * | 3/2006 | Baumgartner et al. | 704/251 |
| 7,022,905 B1 | 4/2006 | Hinman et al. | |
| 7,031,980 B2 * | 4/2006 | Logan et al. | 707/104.1 |
| 7,075,000 B2 | 7/2006 | Gang et al. | |
| 7,081,579 B2 | 7/2006 | Alcalde et al. | |
| 7,171,174 B2 | 1/2007 | Ellis et al. | |
| 7,200,529 B2 | 4/2007 | Cifra et al. | |
| 7,205,471 B2 | 4/2007 | Looney et al. | |
| 7,326,848 B2 | 2/2008 | Weare et al. | |
| 7,373,209 B2 | 5/2008 | Tagawa et al. | |
| 2001/0053944 A1 | 12/2001 | Marks et al. | |
| 2002/0037083 A1 | 3/2002 | Weare et al. | |
| 2002/0038597 A1 | 4/2002 | Huopaniemi et al. | |
| 2002/0088336 A1 | 7/2002 | Stahl | |
| 2003/0046421 A1 | 3/2003 | Horvitz et al. | |
| 2003/0055516 A1 * | 3/2003 | Gang et al. | 700/94 |
| 2003/0072463 A1 | 4/2003 | Chen | |
| 2003/0100967 A1 | 5/2003 | Ogasawara | |
| 2003/0106413 A1 | 6/2003 | Samadani et al. | |
| 2003/0183064 A1 | 10/2003 | Eugene et al. | |
| 2004/0002310 A1 | 1/2004 | Herley et al. | |
| 2004/0049540 A1 | 3/2004 | Wood | |
| 2004/0107268 A1 | 6/2004 | Iriya et al. | |
| 2005/0038819 A1 | 2/2005 | Hicken et al. | |
| 2005/0065976 A1 | 3/2005 | Holm et al. | |
| 2006/0004640 A1 | 1/2006 | Swierczek | |
| 2006/0020614 A1 | 1/2006 | Kolawa et al. | |
| 2006/0026048 A1 | 2/2006 | Kolawa et al. | |
| 2006/0190450 A1 | 8/2006 | Holm et al. | |
| 2006/0242665 A1 | 10/2006 | Knee et al. | |

FOREIGN PATENT DOCUMENTS

| | | |
|---|---|---|
| JP | 8 063 455 | 3/1996 |
| JP | 8 064 355 A | 3/1996 |
| JP | 2002132278 A | 5/2002 |

OTHER PUBLICATIONS

Co-pending U.S. Appl. No. 09/792,343; filed Feb. 23, 2001, entitled System and Method for Creating and Submitting Electronic Shopping Lists, 101 pages.

Co-pending U.S. Appl. No. 09/885,308; filed Jun. 20, 2002, entitled System and Method for Automated Recipe Selection and Shopping List Creation, 9 pages.

Co-pending U.S. Appl. No. 10/278,636; filed Oct. 23, 2002, entitled: Automated Music Profiling and Recommendation, 70 pages.

Internet Papers—http://www.iVillage.com; IVillage.com The Women's Network—busy women sharing solutions and advice; (downloaded May 22, 2001, 11:36 AM), 6 pp.

Internet Papers: http://www.my-meals.com; Meals.com—Recipes, Cooking and Meal Planning; meals.com meal planning made easy; (downloaded May 21, 2001, 5:42 PM); 9 pp.

Internet Papers: http://www.foodfit.com; FoodFit.com: Food, Nutritional Recipes, . . . efs, Healthy Cooking and Fitness Advice; FoodFit.com; (downloaded May 22, 2001, 9:40 AM); 7 pp.

Internet Papers: https://www.mealsforyou.com; Meals For You; (downloaded May 21, 2001, 5:37 PM); 4 pp.

Internet Papers: http://www.ourhouse.com; OurHouse.com: Everything Your House Desires; Tavolo by OurHouse.com; (downloaded May 21, 2001, 6:03 PM); 7 pp.

Internet Papers: http://www.recipezaar.com; Recipezaar—a recipe food cooking & nutritional info site—Recipezaar; (downloaded May 22, 2001, 10:06 AM); 7 pp.

Internet Papers: http://www.ucook.coom; The Ultimate Cookbook; (downloaded May 22, 2001, 10:15 AM); 6 pp.

Unklesbay et al.; An automated system for planning menus for the elderly in title VII nutrition programs; Food Technology 1978, 32 (8) 80-83, 1 page.

Information Technology-Multimedia Content Description Interface-Part 4: Audio, dated Jun. 9, 2001, 119 pgs.

Schonberg et al., Fingerprinting and Forensic Analysis of Multimedia, Proceedings of the 12th Annual ACM International Conference on Multimedia, 2004, pp. 788-795.

Reddo S., On a Spatial Smoothing Technique for Multiple Source Location, 1987, p. 709.

A Steady Stream of New Applications . . . Institutional Distribution; Nov. 1983, 9 pages.

Co-Pending U.S. Appl. No. 09/556,051, filed Apr. 21, 2000, entitled Method and Apparatus for Automated Selection Organization and Recommendation of Items Based on User Preference Topography, 84 pgs.

Co-pending U.S. Appl. No. 09/885,307; filed Jun. 20, 2001, entitled Acoustical Preference Tuner, 37 pages.

Bill Communications Inc. *A Steady Stream of New Applications*, Institutional Distribution, v. 19, Nov. 1983, pp. 80-94.

International Search Report and Written Opinion, dated Jul. 12, 2006, for PCT/US2004/31138, 13 pages.

Allamanche, Eric et al., "Content-based Identification of Audio Material Using MPEG-7 Low Level Description"; 2001; 8 pp.

AudioID—Automatic Identification/Fingerprinting of Audio; http://www.emt.iis.fhg.de/produkte/audioid, Fraunhofer Institut IntegrierteSchaltungen; 5 pp.

Cheng, et al., "Beat Detection Algorithm"; http://www-dsp.rice.edu/courses/el...Projects01/beat_sync /beatalgo.html; 2001; 6 pp.

Doan, A., MongoMusic Fans Include Microsoft; Forbes.com; wysiwyg://53/http://www.forbes.com/2000/09/09/feat2.html, Sep. 9, 2000; 2 pp.

Music Manager Software—Library View; PhatNoise Music Manager, http://www.phatnoise.com/products/software/library.php, Site Copyright 1999-2004; Printed from Internet Jun. 9, 2004; 4pp.

* cited by examiner

SYSTEM AND METHOD FOR RECOGNIZING AUDIO PIECES VIA AUDIO FINGERPRINTING

CROSS-REFERENCE TO RELATED APPLICATION(S)

This application is a continuation of U.S. patent application Ser. No. 10/668,926, filed Sep. 23, 2003, now U.S. Pat. No. 7,013,301, the content of which is hereby incorporated by reference as if set forth in full herein.

FIELD OF THE INVENTION

The present invention is generally related to automatically identifying unknown audio pieces, and more specifically, to a system and method for efficiently identifying unknown audio pieces via their audio fingerprints.

BACKGROUND OF THE INVENTION

It is often desirable to automatically identify an audio piece by analyzing the content of its audio signal, especially when no descriptive data is associated with the audio piece. Prior art fingerprinting systems generally allow recognition of audio pieces based on arbitrary portions of the piece. The fingerprints in the fingerprint database are often time-indexed to allow appropriate alignment of a fingerprint generated based on the arbitrary portion with a stored fingerprint. Time-based fingerprinting systems therefore add an additional complicating step of locating a correct segment in the fingerprint database before any comparison may be performed.

The generating and storing of time-indexed audio fingerprints are redundant if an assumption may be made as to the portion of the audio piece that will be available for fingerprinting. For example, if it is known that the audio piece to be identified will always be available from the beginning of the piece, it is not necessary to maintain time-indexed fingerprints of the audio piece for the various time slices, nor is it necessary to time-align a query fingerprint with a stored fingerprint.

Another problem encountered in prior art fingerprinting systems is that as the number of registered fingerprints in the fingerprint database increases, the time expended to obtain a match also increases.

Thus, what is needed is a fingerprinting system that provides a reliable, fast, and robust identification of audio pieces. Such a system should be configured to reduce the search space in performing the identification for a better matching accuracy and speed.

SUMMARY OF THE INVENTION

According to one embodiment, the invention is directed to a method for making choices from a plurality of audio pieces where the method includes: receiving an audio fingerprint of a first audio piece; searching a database for the audio fingerprint; retrieving an audio profile vector associated with the audio fingerprint, the audio profile vector quantifying a plurality of attributes associated with the audio piece; updating user preference information based on the audio profile vector; and selecting a second audio piece based on the user preference information.

According to another embodiment, the invention is directed to an audio fingerprinting method that includes: receiving an audio signal associated with an audio piece; obtaining a plurality of frequency measurements of the audio signal; building a matrix A based on the frequency measurements; performing a singular value decomposition on the matrix A, wherein $A=USV^T$; retrieving one or more rows of matrix $V^T$; associating the retrieved rows of matrix $V^T$ with the audio piece; and storing the retrieved rows of matrix $V^T$ in a data store.

According to another embodiment, the invention is directed to an audio indexing method that includes: receiving an audio signal of an audio piece; automatically obtaining from the audio signal a list of musical notes included in the audio piece; determining from the audio signal a prominence of the musical notes in the audio piece; selecting a pre-determined number of most prominent musical notes in the audio piece; generating an index based on the selected musical notes; and searching a database based on the generated index.

According to another embodiment, the invention is directed to a method for generating an identifier for an audio class where the method includes: selecting a plurality of audio pieces associated with the audio class; computing an audio fingerprint for each selected audio piece; calculating an average of the computed audio fingerprints; generating an average fingerprint based on the calculation; associating the average fingerprint to the audio class; and storing the average fingerprint in a data store.

According to another embodiment, the invention is directed to an audio selection system that includes: a first data store storing a plurality of audio fingerprints for a plurality of audio pieces; a second data store storing a plurality of audio profile vectors for the plurality of audio fingerprints, each audio profile vector quantifying a plurality of attributes associated with the audio piece corresponding to the audio fingerprint; means for searching the first data store for an audio fingerprint of a first audio piece; means for retrieving from the second data store an audio profile vector associated with the audio fingerprint; means for updating user preference information based on the retrieved audio profile vector; and means for selecting a second audio piece based on the user preference information.

According to another embodiment, the invention is directed to an audio fingerprinting system that includes a processor configured to: receive an audio signal associated with an audio piece; obtain a plurality of frequency measurements of the audio signal; build a matrix A based on the frequency measurements; perform a singular value decomposition on the matrix A, wherein $A=USV^T$; retrieve one or more rows of matrix $V^T$; and associate the retrieved rows of matrix $V^T$ with the audio piece. The audio fingerprint system also includes a data store coupled to the processor for storing the retrieved rows of matrix $V^T$.

According to another embodiment, the invention is directed to an audio indexing system that includes a means for receiving an audio signal of an audio piece; means for automatically obtaining from the audio signal a list of musical notes included in the audio piece; means for determining from the audio signal a prominence of the musical notes in the audio piece; means for selecting a pre-determined number of most prominent musical notes in the audio piece; means for generating an index based on the selected musical notes; and means for searching a database based on the generated index.

According to another embodiment, the invention is directed to a system for generating an identifier for an audio class where the system includes: means for computing an audio fingerprint for each of a plurality of selected audio pieces; means for calculating an average of the computed audio fingerprints; means for associating the calculated average to the audio class; and means for storing the calculated average in a data store.

According to another embodiment, the invention is directed to an article of manufacture comprising a computer readable medium having computer usable program code containing executable instructions that, when executed, cause a computer to perform the steps of: obtaining a plurality of frequency measurements of an audio signal associated with an audio piece; building a matrix A based on the frequency measurements; performing a singular value decomposition on the matrix A, wherein $A=USV^T$; retrieving one or more rows of matrix $V^T$; associating the retrieved rows of matrix $V^T$ with the audio piece; and storing the retrieved rows of matrix $V^T$ in a data store.

According to another embodiment, the invention is directed to an article of manufacture comprising a computer readable medium having computer usable program code containing executable instructions that, when executed, cause a computer to perform the steps of: automatically obtaining from an audio signal of an audio piece, a list of musical notes included in the audio piece; determining from the audio signal a prominence of the musical notes in the audio piece; selecting a pre-determined number of most prominent musical notes in the audio piece; generating an index based on the selected musical notes; and searching a database based on the generated index.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION OF THE INVENTION

Figure 1:
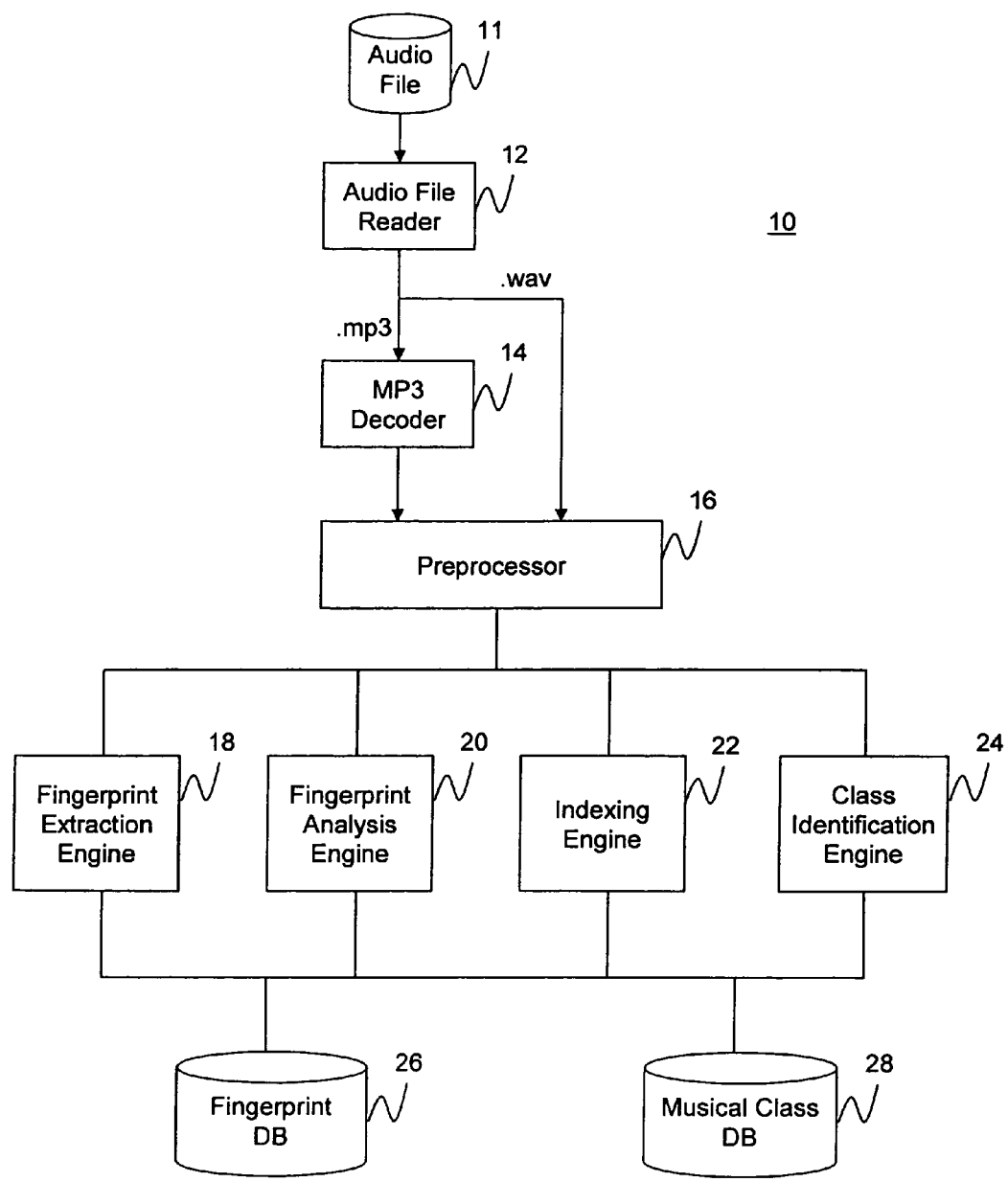
FIG. 1 is a schematic block diagram of an audio fingerprinting system according to one embodiment of the invention.

FIG. 1 is a schematic block diagram of an audio fingerprinting system 10 according to one embodiment of the invention. The system includes an audio file reader 12 for reading different types of audio files 11 or an audio input, and for outputting wave (.wav), MP3 file, or the like. The audio file reader 12 may be, for example, a CD player, DVD player, hard drive, or the like. The file reader 12 may be coupled to an MP3 decoder 14 for decoding MP3 files output by the audio file reader 12. Other types of decoders may also be used for decoding other types of encoded audio files.

The audio file 11 provided to the audio file reader 12 may be an entire audio piece or a portion of the audio piece to be recognized or registered. According to one embodiment of the invention, the audio file contains at least the first thirty seconds of the audio piece. A person of skill in the art should recognize, however, that shorter or longer segments may also be used in alternative embodiments.

The received audio file 11 is transmitted to a music preprocessor 16 which, according to one embodiment of the invention, is configured to take certain pre-processing steps prior to analysis of the audio file. Exemplary pre-processing steps may include normalizing the audio signal to ensure that the maximum level in the signal is the same for all audio samples, transforming the audio data from stereo to mono, eliminating silent portions of the audio file, and the like. A person skilled in the art should recognize, however, that the pre-processing step may be eliminated or may include other types of audio pre-processing steps that are conventional in the art.

The preprocessor 16 is coupled to a fingerprint extraction engine 18, fingerprint analysis engine 20, indexing engine 22, and class identification engine 24. According to one embodiment of the invention, the engines are processors that implement instructions stored in memory. A person of skill in the art should recognize, however, that the engines may be implemented in hardware, firmware (e.g. ASIC), or a combination of hardware, firmware, and software.

According to one embodiment of the invention, the fingerprint extraction engine 18 automatically generates a compact representation, hereinafter referred to as a fingerprint of signature, of the audio file 11, for use as a unique identifier of the audio piece. According to one embodiment of the invention, the audio fingerprint is represented as a matrix.

The fingerprint analysis engine 20 analyzes an audio fingerprint generated by the fingerprint extraction engine 18 for a match against registered fingerprints in a fingerprint database 26. Based on the match, either the fingerprint analysis engine or a separate engine coupled to the fingerprint analysis engine (not shown) retrieves additional data associated with the audio piece. The additional data may be, for example, an audio profile vector (also referred to as acoustic analysis data) that describes the various attributes of the audio piece as is described in further detail in U.S. patent application Ser. No. 10/278,636, filed on Oct. 23, 2002, the content of which is incorporated herein by reference. As described in patent application Ser. No. 10/278,636, the acoustic analysis data is generated based on an automatic processing of audio signals of the audio piece. The acoustic analysis data provides numerical measurements for various predetermined acoustic attributes. Such acoustic attributes include tempo, repeating sections in the audio piece, energy level, presence of particular instruments (e.g. snares, kick drums), rhythm, bass patterns, harmony, particular music classes (e.g. jazz piano trio), and the like. Of course, a person of skill in the art should recognize that other types of data may also be associated with the audio piece, such as, for example, title information, artist or group information, concert information, new release information, and/or links, such as URL links, to further data.

The indexing engine 22 associates the extracted audio fingerprint with an index that may be used by the fingerprint analysis engine 20 to identify a subset of candidates in the fingerprint database 26. According to one embodiment of the invention, the index is generated based on the prominent musical notes contained in the audio piece. Once the index is generated, a subset of audio fingerprints in the fingerprint database 26 to which the audio piece belongs may be identified.

The class identification engine 24 generates identifiers for different sets of audio pieces that belong to particular musical classes. According to one embodiment of the invention, the audio pieces in a particular musical class are similar in terms of overall instrumentation/orchestration. For example, an exemplary musical class may be identified as including a jazz piano trio, acappella singing, acoustic guitar, acoustic piano, solo acoustic guitar with vocal, or the like. The various musical classes may then be included as attributes of an audio profile vector where a values set for a particular musical class attribute indicates how close or far the audio piece is to the musical class. The identifiers and information about the various musical classes may then be stored in a musical class database 28.

The fingerprint database 26 stores a plurality of fingerprints of known audio pieces. The fingerprints may be grouped into discrete subsets based on the musical notes contained in the audio pieces. Each audio fingerprint may be associated with the actual audio file, an audio profile vector, a description of the audio piece (e.g. title, artist and/or group), concert information, new release information, URL links to additional data, and/or the like.

Figure 2:
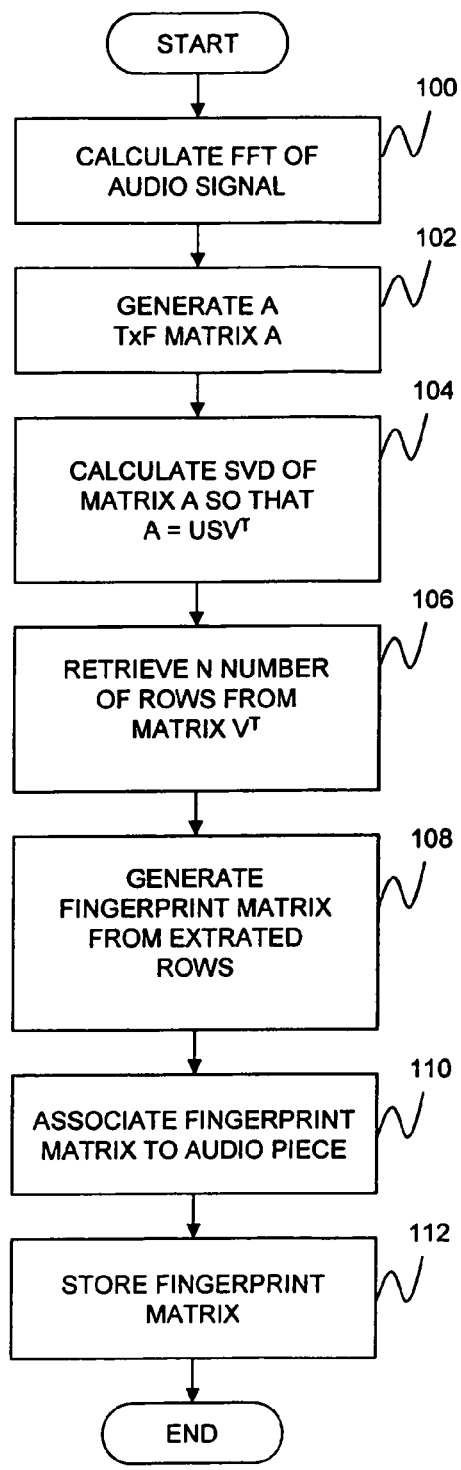
FIG. 2 is a flow diagram of a process for generating an audio fingerprint according to one embodiment of the invention.

FIG. 2 is a flow diagram of a process for generating an audio fingerprint according to one embodiment of the invention. The process starts, and in step 100, the fingerprint extraction engine 18 or a separate fourier transform engine (not shown) calculates a Fast Fourier Transform (FFT) or the like, of the audio signal of the preprocessed audio piece for transforming the signal waveform in the time domain into a signal in the frequency domain. According to one embodiment of the invention, the FFT analysis is resampled to reduce the size of the data for subsequent processing.

Based on the FFT calculation, the fingerprint extraction engine 18 generates, in step 102, a T×F matrix A, where T≧F. According to one embodiment of the invention, the rows of the matrix represent time, and the columns of the matrix represent frequency measurements, also referred to as bins, of the FFT.

In step 104, the fingerprint extraction engine 18 performs the well known matrix operation known as a Singular Value Decomposition (SVD) operation on matrix A. In general terms, SVD is a technique that reduces an original matrix into a product of three matrices as follows:

$$SVD(A)=USV^T$$

where U is a T×F orthogonal matrix, S is an F×F diagonal matrix with positive or zero valued elements, and $V^T$ is the transpose of an F×F orthogonal matrix. According to one embodiment of the invention, the rows of V transposed are the coordinates that capture the most variance, that is, retain the most information about the audio piece in decreasing order of significance as measured by the diagonal entries of the S matrix.

In step 106, the fingerprint extraction engine 18 extracts a predetermined number of rows from the matrix $V^T$ and in step 108, builds a fingerprint matrix from the extracted rows. In step 110, the fingerprint matrix is set as the audio piece's fingerprint by associating the fingerprint matrix to the audio piece in any manner that may be conventional in the art.

In step 112, the fingerprint matrix is stored in a data store. The data store is the fingerprint database 26 if the fingerprint extraction is done for registration purposes. Otherwise, the data store is a temporary storage location for storing the fingerprint matrix for later retrieval by the fingerprint analysis engine 20 for comparing against registered fingerprints.

Unlike many audio fingerprints generated by prior art systems, the audio fingerprint generated via the SVD operation has no notion of time associated with it. A person of skill in the art should recognize, however, that time may be associated with the audio fingerprint generated via the SVD operation. In other words, the process of generating audio fingerprints described with relation to FIG. 2 may be extended to a time-based audio fingerprint system by assigning a time-index to the audio fingerprint generated via the SVD operation, and repeating the process for a moving window across the entire song.

According to one embodiment of the invention, the fingerprint extraction engine 18 may also incorporate prior art fingerprinting techniques such as, for example, spectral centroid and/or spectral flatness measures which result in time-indexed fingerprint measurements. If used, the results of either or both of these measures may be added to the fingerprint matrix generated by the SVD operation.

Figure 3:
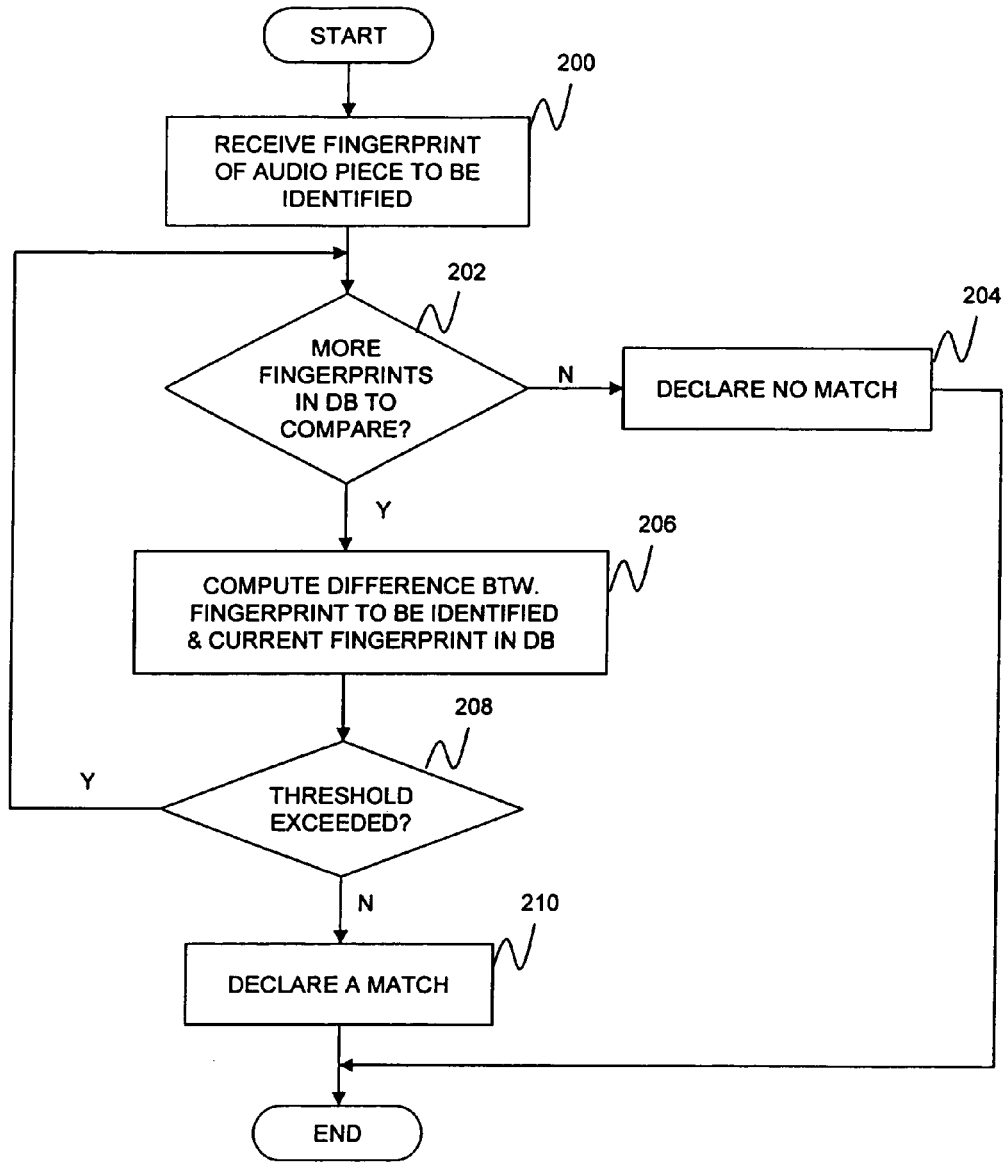
FIG. 3 is a flow diagram of a process for analyzing an extracted audio fingerprint for a match against registered fingerprints according to one embodiment of the invention.

FIG. 3 is a flow diagram of a process executed by the fingerprint analysis engine 20 for analyzing an extracted audio fingerprint for a match against registered fingerprints according to one embodiment of the invention. The process starts, and in step 200, the fingerprint analysis engine 20 receives a fingerprint (fingerprint matrix X) of an audio piece to be identified from the fingerprint extraction engine 18. The fingerprint analysis engine 20 then invokes a search and retrieval routine on the fingerprint database 26 with fingerprint matrix X. In this regard, the fingerprint analysis engine 20 inquires in step 202 whether there are more fingerprints in the fingerprint database 26 to compare. If the answer is NO, then all of the fingerprints in the database have been analyzed without finding a match. In this scenario, the fingerprint analysis engine returns a no match result in step 204.

On the other hand, if there are more fingerprints in the fingerprint database that have not been analyzed, the fingerprint analysis engine 20 computes in step 206, a difference between the fingerprint matrix X and a current fingerprint (fingerprint matrix Y) in the fingerprint database 26. According to one embodiment of the invention, the difference is computed by taking the well-known Euclidian distance measure D for each row vector of the fingerprint matrices X and Y as follows:

$$D=\sqrt{(x_1-y_1)^2+(x_2-y_2)^2+...+(x_m-y_m)^2}$$

where X1, X2, ... Xm are the values of a row vector of fingerprint matrix X, and Y1, Y2, ... Ym are the values of a row vector of fingerprint matrix Y. The distance measures for all the rows of the matrices are summed and, according to one embodiment of the invention, normalized. In step 208, a determination is made as to whether the sum of the distances exceed a threshold value. If the answer is NO, a match is declared. Otherwise, a next fingerprint in the fingerprint database is examined for a match.

According to one embodiment of the invention, if prior art fingerprinting techniques are also introduced, the time-indexed vectors generated by these techniques are measured for distance against corresponding stored fingerprint vectors and scaled by an appropriate constant. The resulting distance calculation is added to the distance calculation computed in step 206. A weighing factor may also be introduced to give more or less weight to the distance calculation performed by a particular technique. The total distance computation is then tested against the threshold value to determine if a match has been made.

Figure 4:
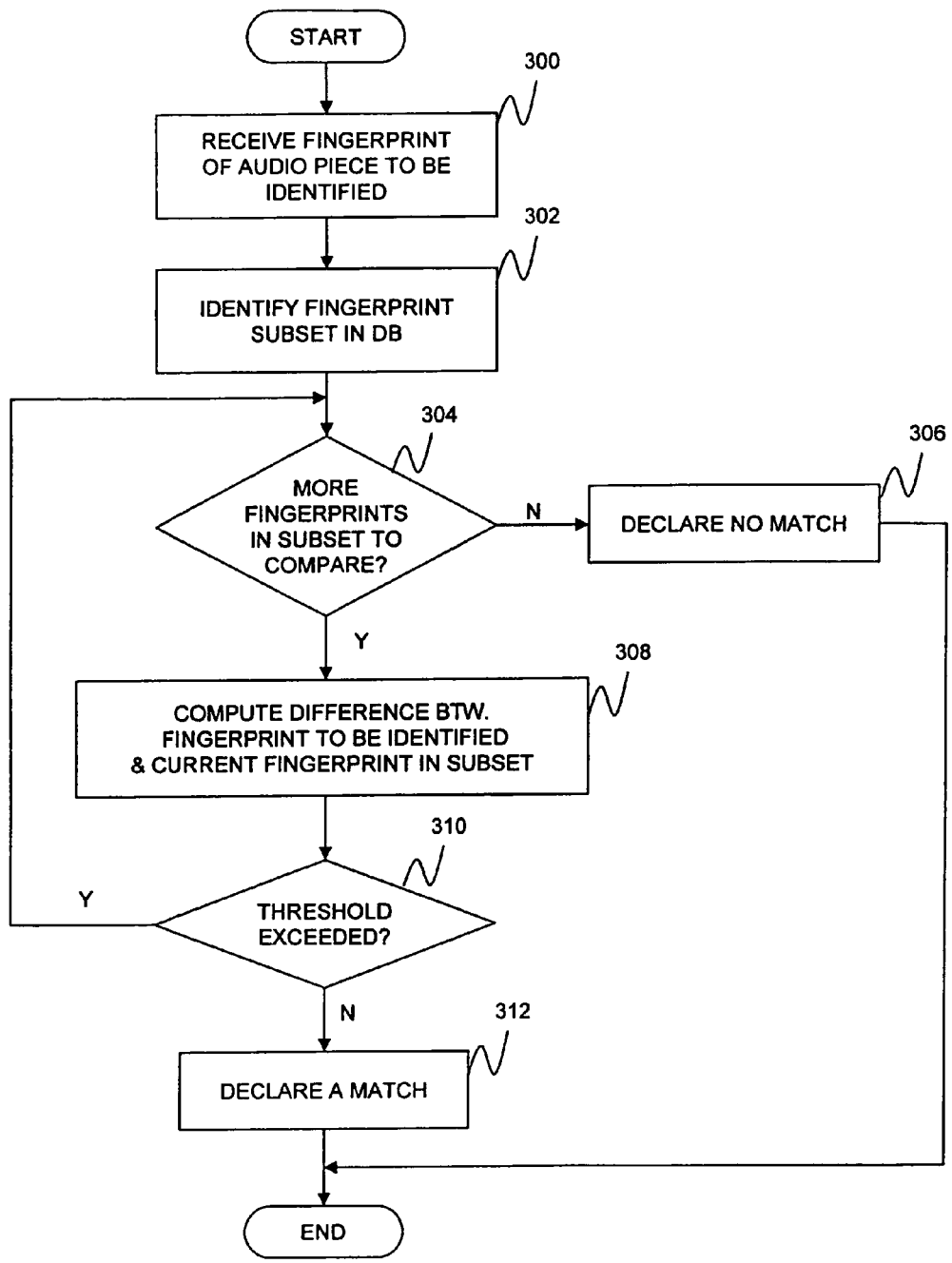
FIG. 4 is a flow diagram of a process for analyzing an extracted audio fingerprint for a match against registered fingerprints according to an alternative embodiment of the invention.

FIG. 4 is a flow diagram of a process executed by the fingerprint analysis engine 20 for analyzing the extracted audio fingerprint for a match against registered fingerprints according to an alternative embodiment of the invention. According to this embodiment, the process starts, and in step 300, the fingerprint analysis engine 20 receives the fingerprint (fingerprint matrix X) of the audio piece to the identified from the fingerprint extraction engine 18. The fingerprint analysis engine 20 invokes the indexing engine 22 in step 302 to identify the index of a subset of fingerprints in the fingerprint database 26 that, if a candidate matching the extracted fingerprint exists, contains the candidate. In this regard, the indexing engine 22 generates a query index for the extracted fingerprint. According to one embodiment of the invention, the index consists of four unordered numbers, and a match is deemed to have been made if an index exists in the fingerprint database that has three identical numbers, in any order, as that of the query index.

The remainder of the process of FIG. 4 continues in the same manner as in FIG. 3, except that the search space is limited to the subset of fingerprints identified by the matching index.

In this regard, the fingerprint analysis engine 20 inquires in step 304 whether there are more fingerprints in the identified subset of the fingerprint database 26 to compare. If the answer is NO, the fingerprint analysis engine 20 returns a no match result in step 306.

If there are more fingerprints in the subset that have not been analyzed, the fingerprint analysis engine 20 computes in step 308 a difference between fingerprint matrix X and a current fingerprint (fingerprint matrix Y) in the subset. In step 310, a determination is made as to whether the difference exceeds a threshold value. If the answer is NO, a match is declared. Otherwise, a next fingerprint in the identified subset is examined for a match.

Figure 5:
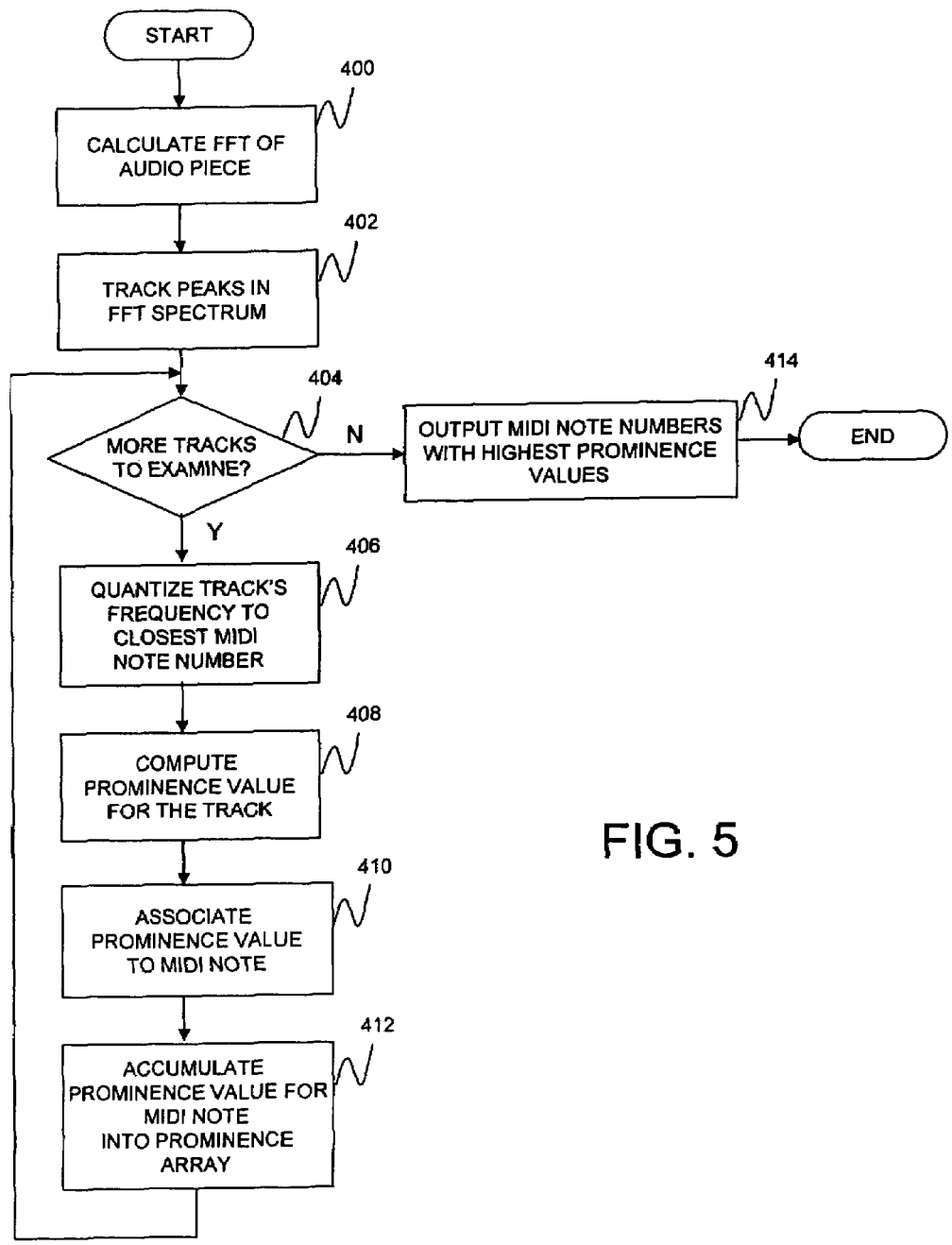
FIG. 5 is a flow diagram of a process for assigning a database index to an audio piece according to one embodiment of the invention.

FIG. 5 is a flow diagram of a process executed by the indexing engine 22 for assigning a database index to an audio piece according to one embodiment of the invention. The database index is used to identify a subset of fingerprints in the fingerprint database 26 for registering a fingerprint extracted by the fingerprint extraction engine 18, or for reducing the candidates that need to be examined in the fingerprint database 26 for a match against the extracted fingerprint.

The process illustrated in FIG. 5 starts, and in step 400, either the indexing engine 22 or a separate fourier transform engine (not shown) calculates the FFT or the like of the audio piece preprocessed by the preprocessor 16 and obtains an FFT spectrum of the audio piece. In step 402, the indexing engine 22 automatically obtains a list of notes of the audio piece. The list of notes are obtained via any of the well-known peak-tracking algorithms that exist in the prior art.

The peak-tracking algorithm generates tracks of local peaks in the FFT which are then analyzed by the indexing engine for their prominency. In this regard, the indexing engine 22 determines in step 404 whether there are any more tracks to examine. If the answer is YES, the engine converts, in step 406, the track's frequency into an integer value that quantizes the track's frequency. According to one embodiment of the invention, this is done by quantizing the track's frequency to a closest MIDI (Musical Instrument Digital Interface) note number in a manner that is well known in the art.

In step 408, the indexing engine 22 computes a prominence value for the track based on factors such as, for example, the track's strength and duration. In step 410, the engine associates the computed prominence value to the track's MIDI note. In step 412, the prominence value for the MIDI note is accumulated into a prominence array. The process then returns to step 404 for analyzing a next track.

If there are no more tracks to examine, the indexing engine 22 selects in step 414, the MIDI note numbers in the prominence array with the highest prominence values and outputs them as an index of the associated subset in the fingerprint database 26. According to one embodiment of the invention, the four MIDI note numbers with the highest prominence values are selected for the index. According to one embodiment of the invention, the index consists of four unordered numbers where the numbers are the selected MIDI note numbers, rendering a total of 24 possible combinations for the index.

Figure 6:
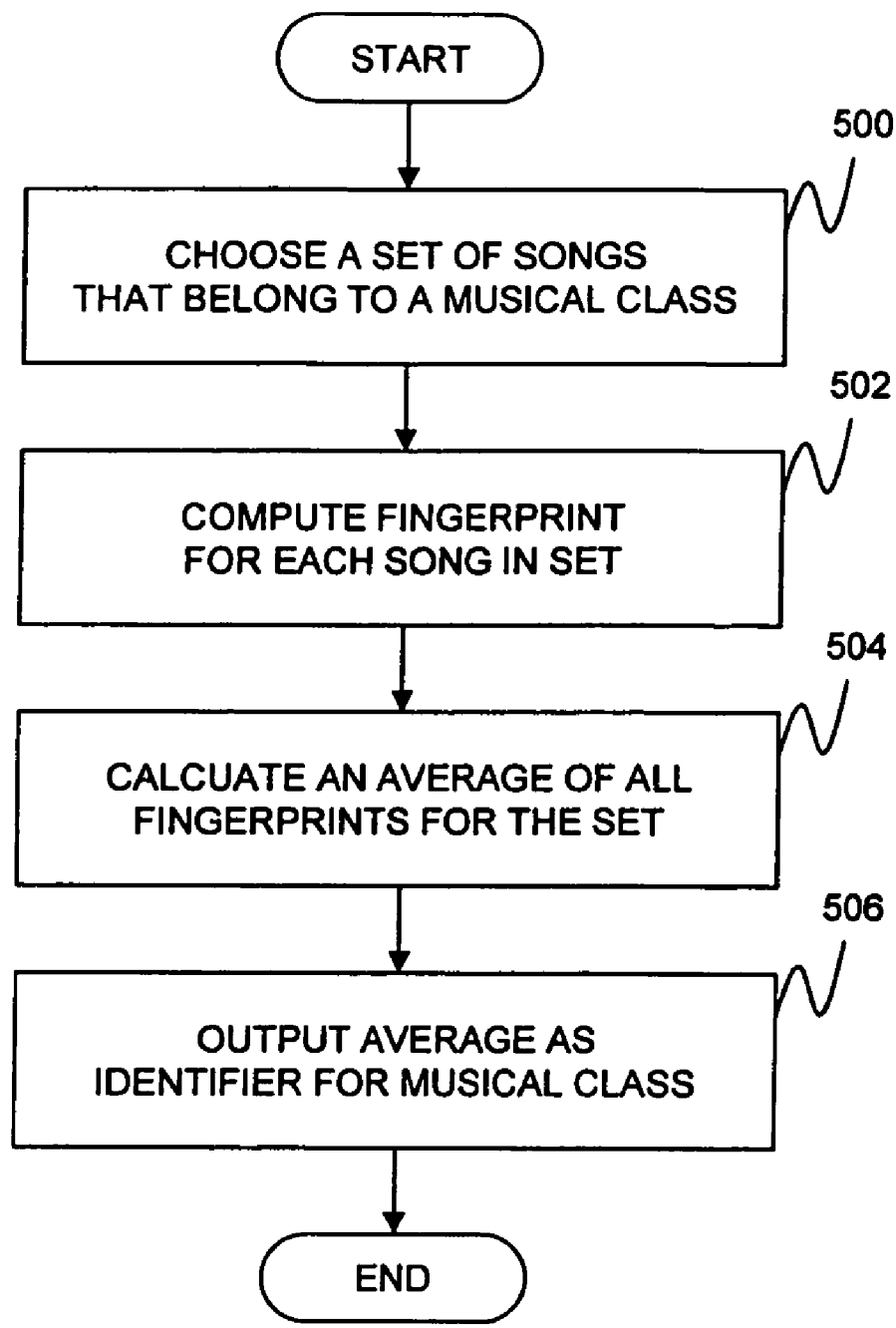
FIG. 6 is a flow diagram of a process for generating an identifier for a particular musical class according to one embodiment of the invention.

FIG. 6 is a flow diagram of a process for generating an identifier for a particular musical class according to one embodiment of the invention. Although this diagram is described in terms of the musical class, a person of skill in the art should recognize that the process extends to all types of audio and audio classes that may be conventional in the art.

The process starts, and in step 500, a set of audio pieces that belong to the musical class are selected. The selection of the pieces may be manual or automatic.

In step 502, the class identification engine computes a fingerprint for each audio piece in the set. According to one embodiment of the invention, the class identification engine invokes the fingerprint extraction engine 18 to compute the fingerprints via SVD operations. Other fingerprinting mechanisms may also be used in lieu and/or addition of the SVD fingerprinting mechanism.

In step 504, the class identification engine 24 calculates an average of the fingerprints generated for the set. In this regard, the class identification engine computes a matrix, referred to as a class ID matrix, that minimizes a distance measure to all the audio pieces in the set in a manner that is well known in the art.

In step 506, the calculated average of the fingerprints represented by the class ID matrix is associated with the musical class and in step 508, stored in the musical class database 28 as its identifier along with other information about the musical class. Such additional information may include, for example, a list of audio pieces that belong to the class, links to the fingerprint database 26 of audio fingerprints of the audio pieces that belong to the class, links to the audio profile vectors for the audio pieces that belong to the class, and/or the like.

Once the identifiers for the musical classes have been generated, calculations may be made to determine how close or far an audio piece is to a particular musical class. This may be done, for example, by computing the distance between the fingerprint extracted for the audio piece and the class ID matrix for the particular musical class.

According to one embodiment of the invention, the various musical classes are used as attributes of an audio piece's audio profile vector. The distance calculations are stored in the audio profile vector for each attribute as an indication of how close the audio piece is to the associated musical class.

Figure 7:
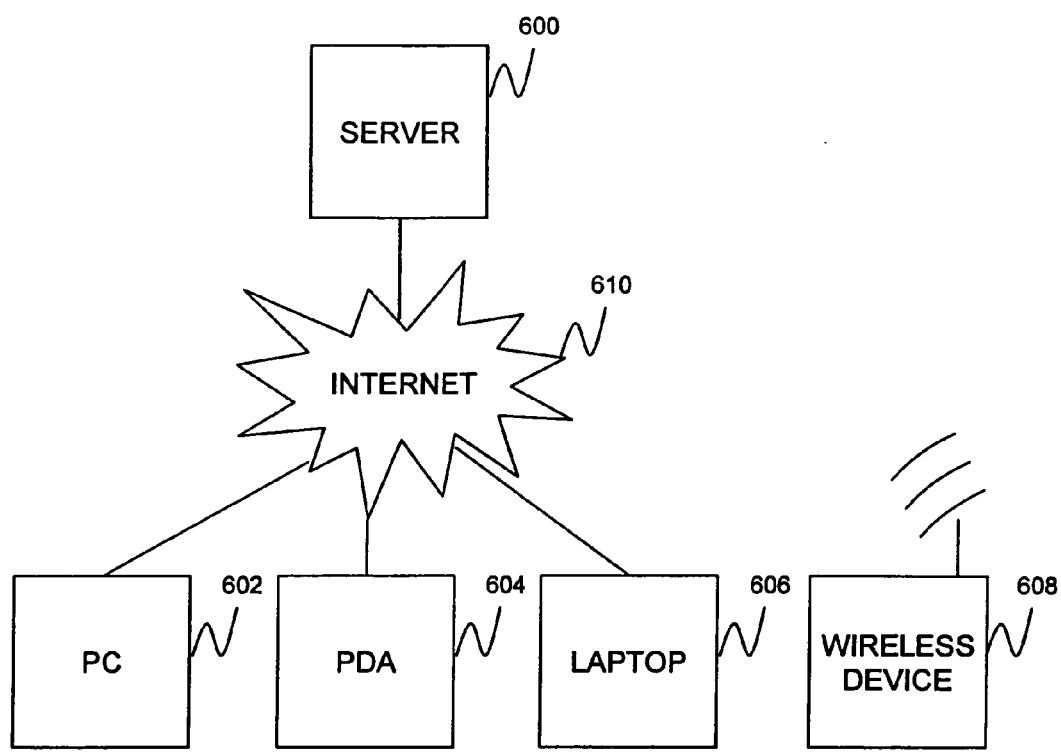
FIG. 7 is a schematic block diagram of an audio recognition system with one or more devices utilizing the audio fingerprinting system of FIG. 1 according to one embodiment of the invention.

FIG. 7 is a schematic block diagram of an audio recognition system with one or more devices utilizing the audio fingerprinting system 10 of FIG. 1 according to one embodiment of the invention. The network includes a server 600 coupled to one or more end terminals 602-608 over a public or private network such as, for example, the internet 610. The end terminals may take the form of personal computers 602, personal digital assistants 604, laptops 606, wireless devices 608, and/or other types of stationary or mobile terminals that are known in the art.

According to one embodiment of the invention, the audio fingerprinting system 10 resides in the server 600. Portions of the audio fingerprinting system may also reside in end terminals 602-608. The server 600 and/or end-terminals 602-608 may also include the music profiler disclosed in U.S. patent application Ser. No. 10/278,636, for automatically analyzing an audio piece and generating an audio profile vector. One or more processors included in the server 600 and/or end terminals 602-608 may further be configured with additional functionality to recommend audio pieces to users based on their preferences. Such functionality includes generating/retrieving audio profile vectors quantifying a plurality of attributes associated with the audio pieces in the audio database, generating/updating user preference vectors, and selecting audio pieces from the audio database based on the user profile vector.

In an exemplary usage of the fingerprinting system 10, a user rates a song that does not have descriptive information associated with it. Instead of transmitting the entire song that the user wants to rate, a fingerprint of the song is transmitted along with the rating information. In this regard, an end terminal used by the user accesses the server 600 and downloads an instance of the fingerprint extraction engine 18 into its memory (not shown). The downloaded fingerprint extraction engine 18 is invoked to extract the fingerprint of the audio piece that is being rated. The extracted fingerprint is transmitted to the server 600 over the internet 610.

Upon receipt of the extracted audio fingerprint, the server 600 invokes the fingerprint analysis engine 20 to determine whether the received fingerprint is registered in the fingerprint database 26. If a match is made, the server retrieves the audio profile vector associated with the fingerprint and uses it to update or generate a user profile vector for the user as is described in further detail in U.S. patent application Ser. No. 10/278,636. Specifically, for a particular piece of music, the audio profile vector quantifies particular attributes found in the music. Such attributes include, but are not limited to, tempo of the music, repeating sections found in the music, energy saturation, snare and kick drum sounds, rhythm, bass pattern, music harmony, and the like. According to one embodiment of the invention, a music profiler analyzes a musical piece and quantifies each attribute in the music vector based on the analysis of such attribute. The user profile vector is then used to recommend other songs to the user.

If a match may not be made, the audio piece is analyzed, preferably by the end terminal, for generating the audio profile vector as is disclosed in further detail in U.S. patent application Ser. No. 10/278,636.

According to one embodiment of the invention, the end terminal may also download an instance of the indexing engine 22 for determining the index of the subset of fingerprints to which the audio piece that is being rated belongs. The indexing information is then also transmitted to the server 600 along with the fingerprint information to expedite the search of the fingerprint database 26.

Although this invention has been described in certain specific embodiments, those skilled in the art will have no difficulty devising variations to the described embodiment which in no way depart from the scope and spirit of the present invention. Moreover, to those skilled in the various arts, the invention itself herein will suggest solutions to other tasks and adaptations for other applications.

For example, the audio fingerprinting system 10 may have applications above and beyond the recognition of audio pieces for generating audio profile vectors. For example, the system 10 may be used to find associated descriptive data (metadata) for unknown pieces of music. The system 10 may also be used to identify and protocol transmitted audio program material on broadcasting stations for verification of scheduled transmission of advertisement spots, securing a composer's royalties for broadcast material, or statistical analysis of program material.

It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. An audio recognition method comprising:
   receiving an audio fingerprint of a musical piece from a client device;
   comparing the received audio fingerprint against a plurality of stored audio fingerprints for a match;
   determining if the received audio fingerprint corresponds to a particular one of the stored audio fingerprints;
   if the received audio fingerprint corresponds to the particular one of the stored audio fingerprints;
      retrieving an audio profile vector stored in association with the particular one of the stored audio fingerprints, the audio profile vector including at least N numerical values quantifying N acoustic attributes of the musical piece, wherein N>0, and wherein at least one of the acoustic attributes is tempo, and the associated numerical value quantifies the tempo of the musical piece based on an automatic processing of audio signals of the musical piece by a music profiling engine; and
      transmitting information stored in association with the retrieved audio profile vector to the client device for doing at least one of generating a music playlist, making music related recommendations, and making other music-related selections; and
   if the received audio fingerprint does not correspond to the particular one of the stored audio fingerprints, prompting the client device for generating the audio profile vector.

2. The method of claim 1, wherein the audio profile vector is generated based on an automatic processing of audio signals of the audio piece.

3. The method of claim 1, wherein one of the plurality of acoustic attributes included in the audio profile vector is associated with a particular audio class, and the numerical value indicates a distance of the audio piece to the audio class.

4. The method of claim 3, wherein the audio class is identified based on an audio class fingerprint, the audio class fingerprint being an average of audio fingerprints of audio pieces associated with the audio class.

5. The method of claim 4, wherein the numerical value indicating the distance of the audio piece to the audio class is determined based on a distance calculation of the received audio fingerprint and the audio class fingerprint.

6. The method of claim 1 further comprising:
   identifying an index of a subset of the plurality of stored audio fingerprints, the index identifying a plurality of musical notes determined to be most prominent for the audio fingerprints in the subset; and
   searching the identified subset for the match.

7. The method of claim 1, wherein if none of the stored audio fingerprints correspond to the received audio fingerprint, invoking the client device to generate the audio profile vector of the audio piece.

8. The method of claim 1, wherein the received and stored audio fingerprints are each represented as a matrix of vectors.

9. The method of claim 8, wherein the received audio fingerprint corresponds to the particular one of the stored audio fingerprints if a distance computation between the matrix representing the received audio fingerprint and the matrix representing the particular one of the stored audio fingerprints results in a single scalar distance value that satisfies a threshold distance.

10. The method of claim 1, wherein the information transmitted to the client device is the retrieved audio profile vector.

11. The method of claim 1 further comprising:
recommending a music item based on the audio profile vector.

12. The method of claim 1 further comprising:
receiving from the client device a user rating with the received audio fingerprint;
modifying user preference information based on the user rating and the retrieved audio profile vector; and
recommending a music item based on the user preference information.

13. The method of claim 1, wherein none of the N numerical values quantifying the N acoustic attributes of the musical piece is determined based on human analysis of the musical piece.

14. An audio recognition method comprising:
receiving an audio fingerprint of an audio piece;
comparing the received audio fingerprint against a plurality of stored audio fingerprints for a match;
identifying the audio piece responsive to a match of the audio fingerprint; and
retrieving information stored in association with the identified audio piece, wherein the audio fingerprint is a representation of matrix $V^T$ generated from a singular value decomposition (SVD) of an N×M matrix A, the matrix A being built based on frequency measurements of audio signals associated with the audio piece, wherein $SVD(A)=USV^T$, where U is an N×M orthogonal matrix, S in an M×M diagonal matrix, and $V^T$ is a transpose of an M×M orthogonal matrix.

15. The method of claim 14, wherein rows of the matrix A represent time, and columns of the matrix A represent the frequency measurements.

16. An audio recognition system comprising:
a first data store storing a plurality of audio fingerprints for a plurality of audio pieces;
one or more processors;
one or more memory devices operably coupled to the one or more processors storing program instructions therein, each of the one or more processors being operable to execute one or more of the program instructions, the program instructions including:
receiving an audio fingerprint of a particular musical piece from a client device;
comparing the received audio fingerprint against the plurality of stored audio fingerprints for a match;
determining if the received audio fingerprint corresponds to a particular one of the stored audio fingerprints;
retrieving an audio profile vector stored in association with the particular one of the stored audio fingerprints if the received audio fingerprint corresponds to the particular one of the stored audio fingerprints, the audio profile vector including at least N numerical values quantifying N acoustic attributes of the musical piece, wherein N>0, and wherein at least one of the acoustic attributes is tempo, and the associated numerical value quantifies the tempo of the musical piece based on an automatic processing of audio signals of the audio piece by a music profiling engine;
transmitting information stored in association with the retrieved audio profile vector to the client device for doing at least one of generating a music playlist, making music related recommendations, and making other music-related selections; and
prompting the client device for generating the audio profile vector if the received audio fingerprint does not correspond to the particular one of the stored audio fingerprints.

17. The system of claim 16 further comprising:
a second data store storing the audio profile vector in association with the particular one of the stored audio fingerprints, the audio profile vector being generated based on an automatic processing of audio signals of the audio piece.

18. The system of claim 17, wherein one of the plurality of acoustic attributes included in the audio profile vector is associated with a particular audio class, and the numerical value indicates a distance of the audio piece to the audio class.

19. The system of claim 18, wherein the audio class is identified based on an audio class fingerprint, the audio class fingerprint being an average of audio fingerprints of audio pieces associated with the audio class.

20. The system of claim 16, wherein the program instructions further include:
identifying an index of a subset of the plurality of stored audio fingerprints based on the audio fingerprint, the index identifying a plurality of musical notes determined to be most prominent for the audio fingerprints in the subset; and
searching the identified subset for the match.

21. An audio recognition system comprising:
a first data store storing a plurality of audio fingerprints for a plurality of audio pieces;
one or more processors;
one or more memory devices operably coupled to the one or more processors storing program instructions therein, each of the one or more processors being operable to execute one or more of the program instructions, the program instructions including:
receiving an audio fingerprint of a particular audio piece;
comparing the received audio fingerprint against the plurality of stored audio fingerprints for a match;
identifying the audio piece responsive to a match of the audio fingerprint; and
retrieving information stored in association with the identified audio piece, wherein the audio fingerprint is a representation of matrix $V^T$ generated from a singular value decomposition (SVD) of an N×M matrix A, the matrix A being built based on frequency measurements of audio signals associated with the audio piece, wherein $SVD(A)=USV^T$, where U is an N×M orthogonal matrix, S in an M×M diagonal matrix, and $V^T$ is a transpose of an M×M orthogonal matrix.

22. The system of claim 21, wherein rows of the matrix A represent time, and columns of the matrix A represent the frequency measurements.

* * * * *

UNITED STATES PATENT AND TRADEMARK OFFICE
CERTIFICATE OF CORRECTION

PATENT NO. : 7,487,180 B2
APPLICATION NO. : 11/345548
DATED : February 3, 2009
INVENTOR(S) : Frode Holm Page 1 of 1

It is certified that error appears in the above-identified patent and that said Letters Patent is hereby corrected as shown below:

Column 11, line 45, Claim 15    Delete "The method of claim 14",
                                Insert --The system of claim 14--

Column 12, line 63, Claim 22    Delete "The system of claim 21",
                                Insert --The method of claim 21--

Signed and Sealed this

Sixth Day of October, 2009

David J. Kappos
*Director of the United States Patent and Trademark Office*